United States Patent Office 3,054,673
Patented Sept. 18, 1962

3,054,673
NON-CURLING FILM
Wallace Lloyd Bostwick, Vestal, N.Y., assignor to General Aniline & Film Corporation, New York, N.Y., a corporation of Delaware
No Drawing. Filed Feb. 19, 1958, Ser. No. 716,051
6 Claims. (Cl. 96—87)

The present invention relates to a non-curling film which may be used for many purposes, and relates more particularly to a non-curling film suitable for use as a base for photographic emulsions.

A photographic film base is usually manufactured from cellulose esters or mixed esters such as cellulose acetate or cellulose acetate butyrate by the well-known solvent casting technique. The prior art films of this type have a tendency to curl upon storage. This tendency to curl has long been a serious problem, especially in the photographic art since a curled film presents many difficulties in handling and in processing particularly in automatic processing equipment. Also, in camera backs, film holders, film packs, etc., the film must lie flat in order to prevent optical distortion of the photographic image. It is also of the utmost importance that the film remain flat after developing or processing. For example, X-ray films must lie flat on examining light frames, while negatives and transparencies must be flat to facilitate their use in machines for making prints.

The curl of photographic films particularly at high humidity (70%–100% relative humidity) is determined by the curl of the plastic film base. Curl values have been arbitrarily defined as being equal to 100 divided by the radius of curvature in inches defined by the arc of the edge of the film sheet. By this definition, the larger numbers indicate the greater curl.

It is, accordingly, an object of this invention to provide a film which is substantially non-curling.

It is a further object of this invention to provide an improved cellulose ester film suitable as a base for photographic emulsions in which the tendency to curl is reduced to a minimum.

A still further object of this invention is to provide a plasticized cellulose ester film that can be stored under extreme conditions of humidity without curling the film.

Another object of this invention is to provide a novel plasticizer for cellulose esters.

Other objects and advantages of my invention will appear as description thereof proceeds.

In a conventional process for manufacturing cellulosic film a solution is first formed comprising the cellulose ester, such as cellulose acetate, a solvent therefor and a plasticizer for the ester. The solution or dope thus produced is then cast upon a suitable casting surface such as a belt, for example, the solvent evaporated and the solidified film removed from the casting surface. The plasticizers most commonly used in the preparation of prior art films are triphenyl phosphate, tricresyl phosphate, dibutyl phthalate and dimethyl phthalate alone or in an admixture with one another. All of these plasticizers are monomers.

Investigation has established that the concentration of such plasticizers in the cellulose ester film base differs throughout the thickness of the film and it is believed that these differences in the concentration of the plasticizer cause the curling of the film and that the greater these differences in concentration, the greater is the curl of the film. These differences in the concentration of the plasticizer in the thickness of the film are believed to be due, in part at least, to migration of the plasticizer in the film before or after it is solidified. In has been suggested to use gelatin non-curl layers on the cellulosic film base used in photography. These, however, have not been found to be effective under all conditions of temperature and humidity and they cannot be used on many types of film.

I have found that by incorporating in the cellulose ester from which the film is produced a low molecular weight polymer as a plasticizer in place of the prior art monomeric plasticizers, a film which has a greatly reduced tendency to curl may be produced. The low molecular weight polymers suitable for use as plasticizers in accordance with my invention comprise esters of a glycol or a polyglycol with at least one dibasic acid and at least one monobasic acid, the latter constituting terminal groupings of the ester polymer. The ester contains dibasic acid-glycol units ranging from one to eight. Otherwise expressed, the polymer contains a monobasic acid chain stopped dibasic acid-glycol linear ester containing from one to eight dibasic acid-glycol units. The mono and dibasic acids constitute approximately 70% of the polyester. Both the mono and dibasic acids may be mixtures of saturated acids ranging from $C_5$ to $C_{16}$ in chain length. These polymers are known compounds. One of these is sold on the market under the name "Plastolein 9720" by the Emery Industries, Inc.

Examples of the monobasic acids that may be used to form the polyester are valeric acid, caproic acid, caprylic acid, pelargonic acid, capric acid, palmitic acid and mixtures of these acids. Of the dibasic acids, the following have been found to be suitable: adipic acid, azelaic acid, sebacic acid, thapsic acid and mixtures of these acids.

Examples of the glycols that may be used to form the polyester are ethylene glycol, propylene glycol, diethylene glycol, triethylene glycol, dipropylene glycol, 2-ethylhexanediol and 2,4-pentanediol.

The polymer of the polyester used as a plasticizer according to this invention may be prepared by heating the glycol, dibasic acid and the monobasic acid together under the proper conditions of temperature, time and pressure. The polyesterification is conducted at a temperature of 100 to 250° C., preferably between 140 and 160° C. for two hours in the presence of an inert gas such as nitrogen at prevalent atmospheric pressure. The water is formed and distilled off during the reaction time. If desired, water and any excess of glycol can be removed by distillation at reduced pressure after the polymer is formed. The average molecular weight of the polymer should be about 850.

The following specific examples of solutions useful in the preparation of the non-curling film base of this invention are given. However, it is to be understood that these examples are given by way of illustration only and not by way of limitation.

*Example 1*

A film forming solution of cellulose ester was prepared with the following ingredients. The parts given are by weight.

| | Parts |
|---|---|
| Cellulose acetate 60.0% combined acetic acid ASTM (D), viscosity 90 sec | 15.6 |
| Polyester plasticizer made of 2 mols azelaic acid, 2 mols pelargonic acid and 3 mols ethylene glycol | 2.4 |
| Methylene chloride | 73.1 |
| Methanol | 6.4 |
| Cyclohexane | 2.5 |

This solution was cast into a film base having a thickness of about 0.008 inch by spreading the solution on a casting surface and drying in the usual manner. When tested for curl, it was found that the curl of the film base containing the low molecular weight polyester polymer as a plasticizer and produced as described above had a value of 12. A similar film base produced in a manner similar to that described above except that the usual plasticizer comprising a mixture of triphenyl phosphate and dimethyl phthalate was used had, upon testing, a curl value of 23. Thus it can be seen that a film base containing my novel plasticizer had a curl value of only slightly more than one-half that of a film of the prior art.

*Example II*

The novel film base produced as described in Example I was then treated to produce a photographic film. The base was coated on both sides with a subbing solution in order to obtain adhesion between the base and the light-sensitive gelatin emulsion. The subbing solution used contained the following ingredients:

| | Grams |
|---|---|
| Gelatin | 0.8 |
| Water | 2.0 |
| Phthalic acid | 0.2 |
| Methanol | 40.0 |
| Acetone | 56.1 |
| Cellulose acetate | 0.7 |
| Glyoxal | 0.2 |

The thus coated film base was then coated with a conventional X-ray gelatin-silver halide emulsion. The finished photographic film was tested for curl which was found to have a value of 2. A similarly produced prior art photographic film having the usual plasticizer of triphenyl phosphate and dimethyl phthalate had a curl value of 5.

*Example III*

A film forming solution of cellulose acetate was prepared with the following ingredients. The parts given are by weight.

| | Parts |
|---|---|
| Cellulose acetate 60.0% combined acetic acid, ASTM (D) viscosity 90 sec | 15.6 |
| "Plastolein 9720" plasticizer | 2.4 |
| Methylene chloride | 73.1 |
| Methanol | 6.4 |
| Cyclohexane | 2.5 |

A film base was cast from the above solution in the conventional manner. Upon testing the base, prior to the coating thereof with a subbing layer and with a photographic emulsion, it was found that the film produced as above had a curl value of 12 as compared to 23, the curl value of a prior art film containing triphenyl phosphate and dimethyl phthalate as a plasticizer. When coated with the subbing layer and photographic emulsion as described in Example II, the novel film of this invention had a curl value of 2 as compared to a curl value of 5 for the coated prior art film.

Various modifications may be made in the processes and solutions disclosed in the examples. Thus the concentration of the cellulose acetate in the casting solution may be varied between 8% and 20%. Other low molecular weight polymers of the polyesters already mentioned may be used as plasticizers. The molecular weight of these polyester polymers may range from 500 to 1200. However, I prefer to use a polyester polymer having a molecular weight of approximately 850. While I have described in the examples the use of our novel plasticizer in connection with cellulose acetate, it is suitable for use with other film forming cellulose esters or mixed esters, as for example, cellulose acetate butyrate. Other modifications will become obvious to those skilled in the art.

My invention, accordingly, is not limited to the specific disclosure contained herein but includes all modifications that fall within the scope of the appended claims.

I claim:

1. A photographic film comprising a film base of a water-insoluble lower aliphatic ester of cellulose having a plasticizer incorporated therein, a gelatin-silver halide emulsion and a gelatin containing subbing layer for adhering the emulsion to the base, said plasticizer comprising a low molecular weight polymer of a monobasic acid chain stopped dibasic acid-glycol linear ester containing from one to eight dibasic acid-glycol units.

2. A photographic film as recited in claim 1 wherein the ester is cellulose acetate.

3. A photographic film as recited in claim 1 wherein the ester is cellulose acetate butyrate.

4. A photographic film as recited in claim 1 wherein the polymer is the reaction product of ethylene glycol, azelaic acid and pelargonic acid.

5. A photographic film as recited in claim 4 wherein the polymer has a molecular weight of 850.

6. A photographic film as recited in claim 1 wherein the average molecular weight of said polymer is between 500 and 1200.

References Cited in the file of this patent

UNITED STATES PATENTS

| 2,096,675 | Babcock | Oct. 19, 1937 |
| 2,106,703 | Cox et al. | Feb. 1, 1938 |
| 2,196,775 | McNally | Apr. 9, 1940 |
| 2,527,267 | Hart et al. | Oct. 24, 1950 |
| 2,541,478 | Nadeau et al. | Feb. 13, 1951 |
| 2,591,077 | Lamborn | Apr. 1, 1952 |
| 2,689,799 | Albus et al. | Sept. 21, 1954 |
| 2,740,723 | Voris | Apr. 3, 1956 |
| 2,744,025 | Albus et al. | May 1, 1956 |